Patented Feb. 26, 1935

1,992,638

UNITED STATES PATENT OFFICE 1,992,638

METHOD OF PREPARING MOLDING POWDER

Carleton N. Smith, Lakewood, Ohio, assignor to National Carbon Company, Inc., a corporation of New York No Drawing. Application July 29, 1932, Serial No. 626,221

6 Claims. (Cl. 260—2)

My invention relates to the preparation of molding powders and especially to a molding powder that is useful in the preparation of brushes for electrical machinery and which consists of carbon or graphite, with or without the addition of other conductive material, such as finely divided metallic particles, and a binder. The material employed as a binder is a vinyl resin, such as may be formed by the conjoint polymerization of vinyl chloride and vinyl acetate. I have found that good results are obtained by the use of a mixture of 4 parts of vinyl chloride and 1 part of vinyl acetate.

The objects of my invention are to produce a form of vinyl resin, which shall be especially useful in the production of brushes for use in connection with electrical machinery. Another object of my invention is to produce a vinyl resin in a form of uniform particle size which shall be almost impalpable. These and other objects of my invention will be evident from the following specification.

I have found that the efficiency of a material used as a binder in molding compositions is enhanced by any treatment or mixing procedure which will give it a more uniform distribution throughout the mix. The fineness of the binder material is an important factor regulating the uniformity and extent of its distribution.

The dry powdered molding resins are prepared from acetone solutions of polymerized vinyl resins such as those formed by the conjoint polymerization of vinyl halides and vinyl esters of the lower fatty acids, by precipitation into water. These resins tend to come down in a somewhat gummy condition and form coarse floccules which coagulate into tough particles upon drying. These toughened aggregates are exceedingly difficult to mill and this condition prevents the preparation of a uniformly and finely divided molding powder. It is known that this tendency toward the formation of gummy or coarsely coagulated resins can be lessened to some extent by increasing the ratio of acetone or other solvent to dissolved resin or by the addition of small amounts of acetone to the water prior to precipitation. However, such control is limited and is not entirely effective with certain commercial grades of resins.

I have discovered that by the addition of ammonia or organic amines, such for example as triethanolamine, diethylamine, aniline or pyridine, to the water, the precipitation process may be so improved that the formation of gummy nodules is entirely prevented. Furthermore, the tendency toward flocculation of the precipitated resin can be controlled, so that a very finely divided precipitate is formed. As a result of this regulated fineness the bonding power of the commercial resins has been materially improved and the uniformity of the molded articles increased to a much greater degree than could be effected by milling the original resin for many hours in a ball mill.

The precipitation process may be carried out by adding an acetone solution of the resin to a rapidly agitated solution of ammonia or organic amine in water. The resultant colloidal mixture is then loosely flocculated to facilitate filtration by the addition of a small amount of inorganic acid, salt or a base not containing ammonia or an amine. While I have found that the ammonia concentration in the precipitating solution is not critical, a working range of 1% to 20% is preferred. Satisfactory precipitation from the acetone solution can be obtained with resin concentrations not exceeding 8 grams per 100 cubic centimeters of acetone when 20% of concentrated ammonium hydroxide is used. This concentrated ammonium hydroxide should have an ammonia concentration of 28 to 29% and a specific gravity of 0.90. A very fine granular preciptate is obtained using 2.5% solution of the resin in acetone, and the ammonium hydroxide concentration can be reduced to 5% without appreciably affecting its fineness. A fibrous precipitate will be obtained if higher resin concentrations than 8 grams per 100 cubic centimeters of acetone are used, regardless of the ammonia content of the precipitant. On the other hand an excessively high ratio of acetone to water should be avoided.

As an example I now describe the preparation of a molding powder from a resin formed by a conjoint polymerization of 4 parts of vinyl chloride and 1 part of vinyl acetate. Twenty-five grams of the dry resin were dissolved in 1 liter of acetone, and 140 cubic centimeters of this solution was slowly run into a violently agitated solution of a mixture of 1280 cubic centimeters of distilled water and 320 cubic centimeters of ammonium hydroxide, the solution being maintained at a temperature of 30° to 35° C. A colloidal suspension of the vinyl resin was obtained, much of which would not be retained by ordinary filter paper. An addition of 5 cubic centimeters of concentrated hydrochloric acid to the suspension flocculates the resin which thereby becomes filterable. After filtration, the precipitated resin is thoroughly washed with water, is then allowed to dry at 40° C. for approximately twenty hours. This is followed by vacuum drying for four hours at 50°. The resulting small aggregates are easily broken up into an impalpable powder.

I found that brushes formed from this material are an improvement over those employing finely mechanically divided resin. The following table gives the results obtained with a mixture of 5% polymerized vinyl resin and 95% graphite. The mechanically divided resin was passed through a 200 mesh screen.

| | Fibre stress pounds per sq. in. | Average motor wear per 1,000 hours service |
|---|---|---|
| 200 mesh milled resin binder | 2,976 | 0.750 inch |
| Precipitated resin binder | 4,182 | 0.354 inch |

I claim:

1. Method of forming a molding powder which comprises forming a solution of a resin formed by the polymerization of mixtures of vinyl halide esters and vinyl esters of the lower fatty acids in acetone, said solution containing about 2.5% of resin, adding thereto a solution of at least 5% of concentrated ammonium hydroxide, said addition being accompanied by rapid agitation and thereafter precipitating the powder by adding thereto an electrolyte other than ammonia.

2. Method of producing a molding material in powder form, which comprises adding to a solution of a resin formed by the polymerization of vinyl esters, a substance selected from the group consisting of ammonia and organic amines, said addition being accompanied by rapid agitation whereby a colloidal suspension of the resin in liquid is formed, and thereafter precipitating the colloidal resin in finely-divided form by neutralizing the liquid at least in part with an electrolyte.

3. Method of producing a molding composition in powdered form, which comprises preparing a solution of the resin resulting from the conjoint polymerization of vinyl chloride and vinyl acetate, adding a substance selected from the group consisting of ammonia and organic amines to the solution and rapidly agitating the mixture thereby forming a colloidal suspension of the resin, and thereafter flocculating the resin as a finely-divided powder by adding to the suspension an electrolyte other than the substances included in the said group.

4. Method of forming a molding powder which comprises forming a solution in a volatile organic solvent of a resin formed by the polymerization of vinyl esters, forming a colloidal suspension by the addition to the solution of a member of the group consisting of ammonia and organic amines, said addition being accompanied by rapid agitation of the mixture so formed, and thereafter precipitating the suspended powder by the addition of an electrolyte other than those in said group.

5. Method of forming a molding powder which comprises forming an acetone solution of a resin formed by the polymerization of vinyl esters, said solution containing not more than 8 grams of resin per 100 cubic centimeters of acetone, adding a solution containing a member of the group consisting of ammonia and organic amines to the first solution while rapidly agitating the mixture so formed to produce a colloidal suspension of the resin, and precipitating the colloidal resin in the form of a finely divided powder by adding an electrolyte other than a member of said group.

6. Method of forming a molding powder which comprises forming a solution in a volatile solvent of the resin formed by the conjoint polymerization of vinyl chloride and vinyl acetate, adding aqueous ammonia to the solution and concomitantly rapidly agitating the mixture so formed to produce a colloidal suspension of the resin, and thereafter precipitating the molding powder in an impalpable form.

CARLETON N. SMITH.